April 8, 1952
C. R. YOUNGER
2,592,097
TRACTOR-MOUNTED COTTON CHOPPER
Filed Sept. 11, 1947
5 Sheets-Sheet 1
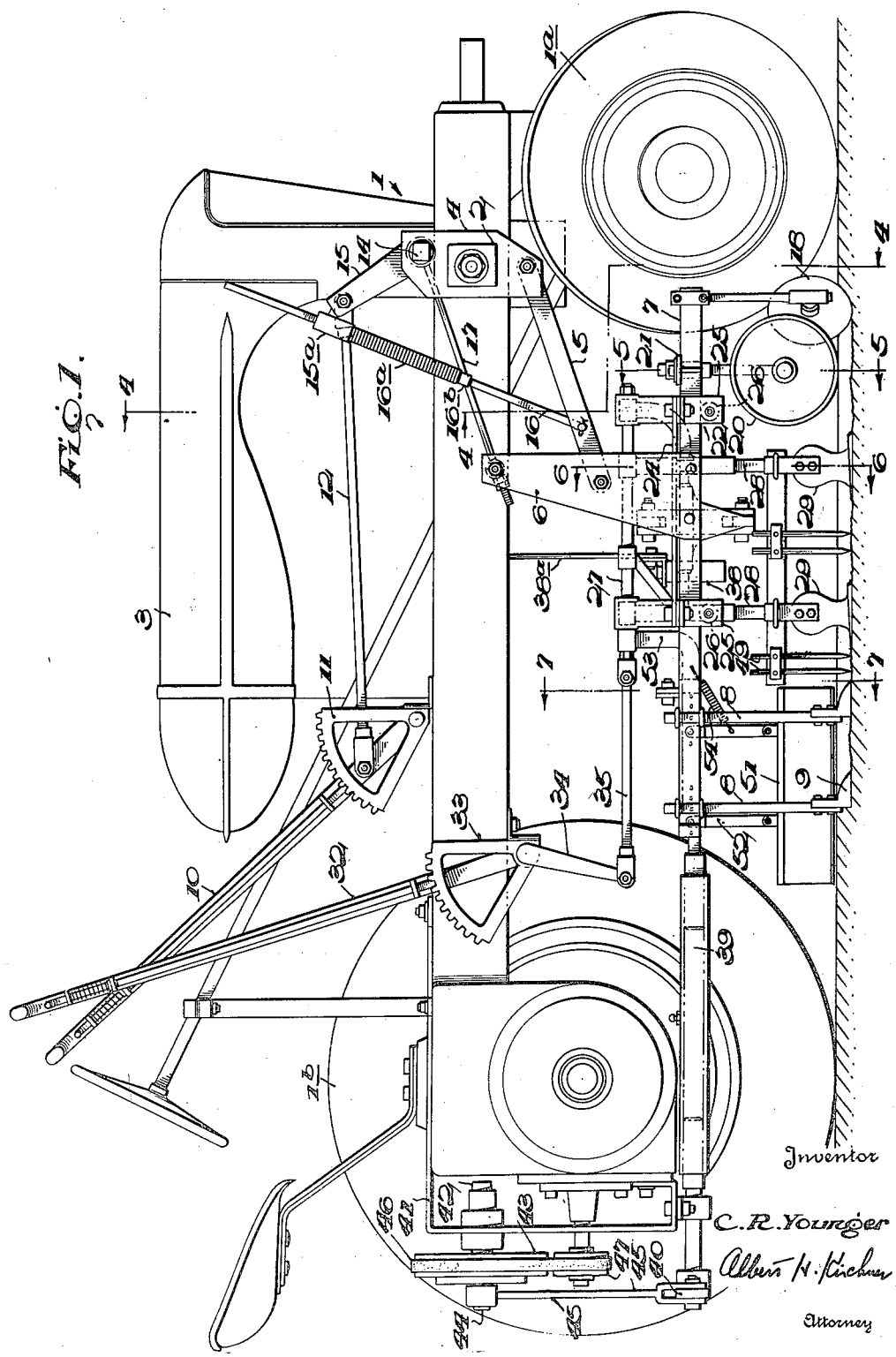

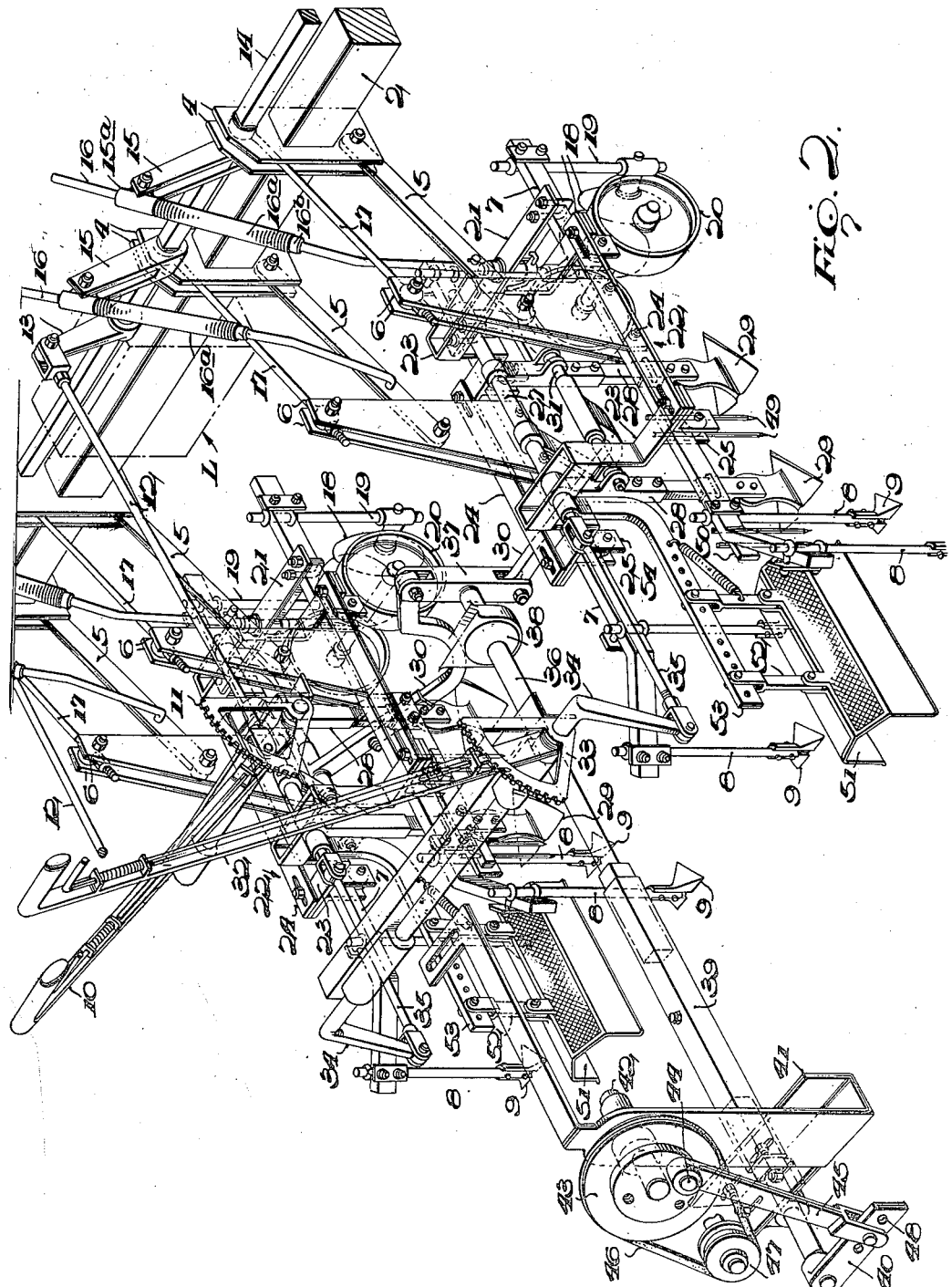

April 8, 1952 C. R. YOUNGER 2,592,097
TRACTOR-MOUNTED COTTON CHOPPER
Filed Sept. 11, 1947 5 Sheets-Sheet 3
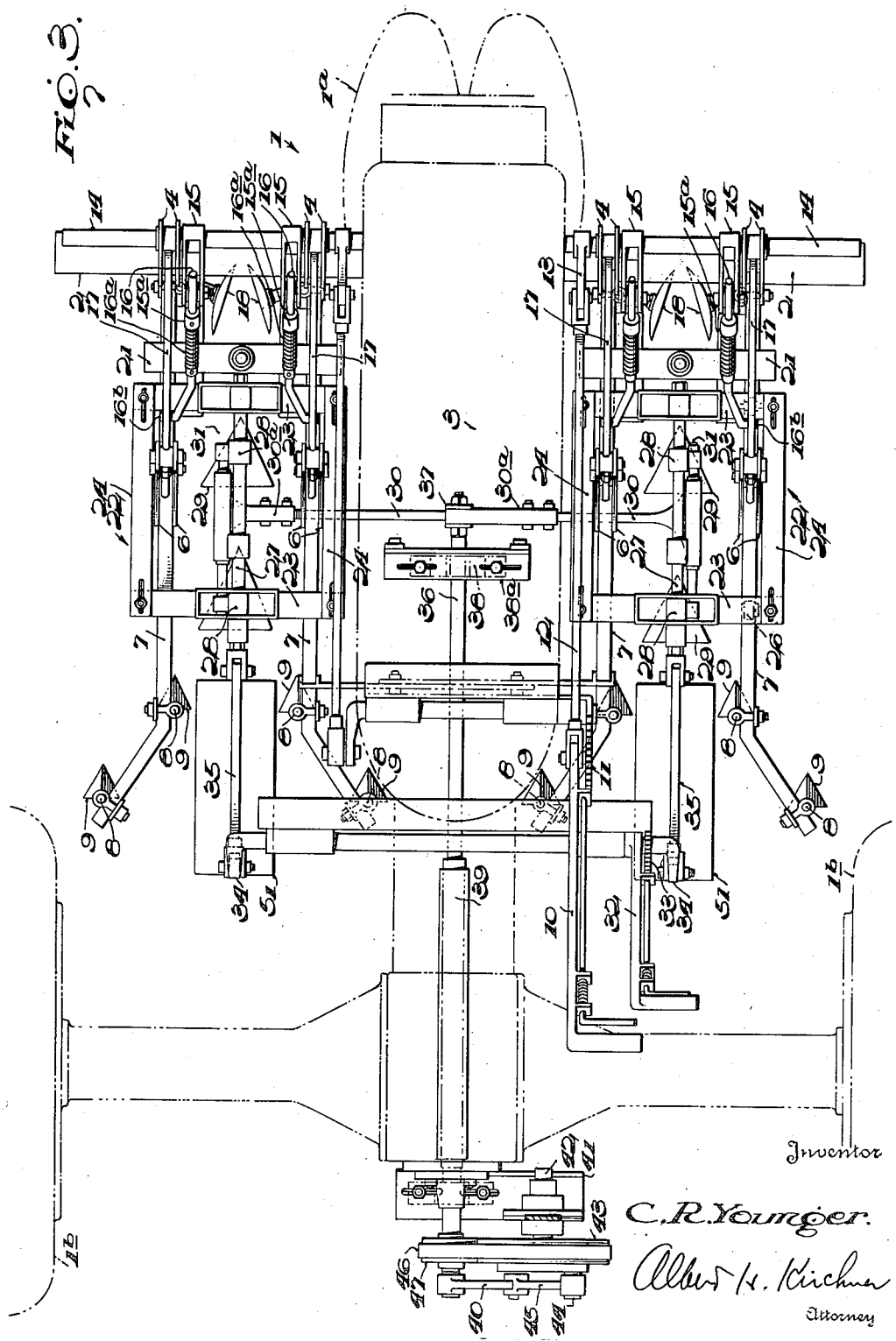

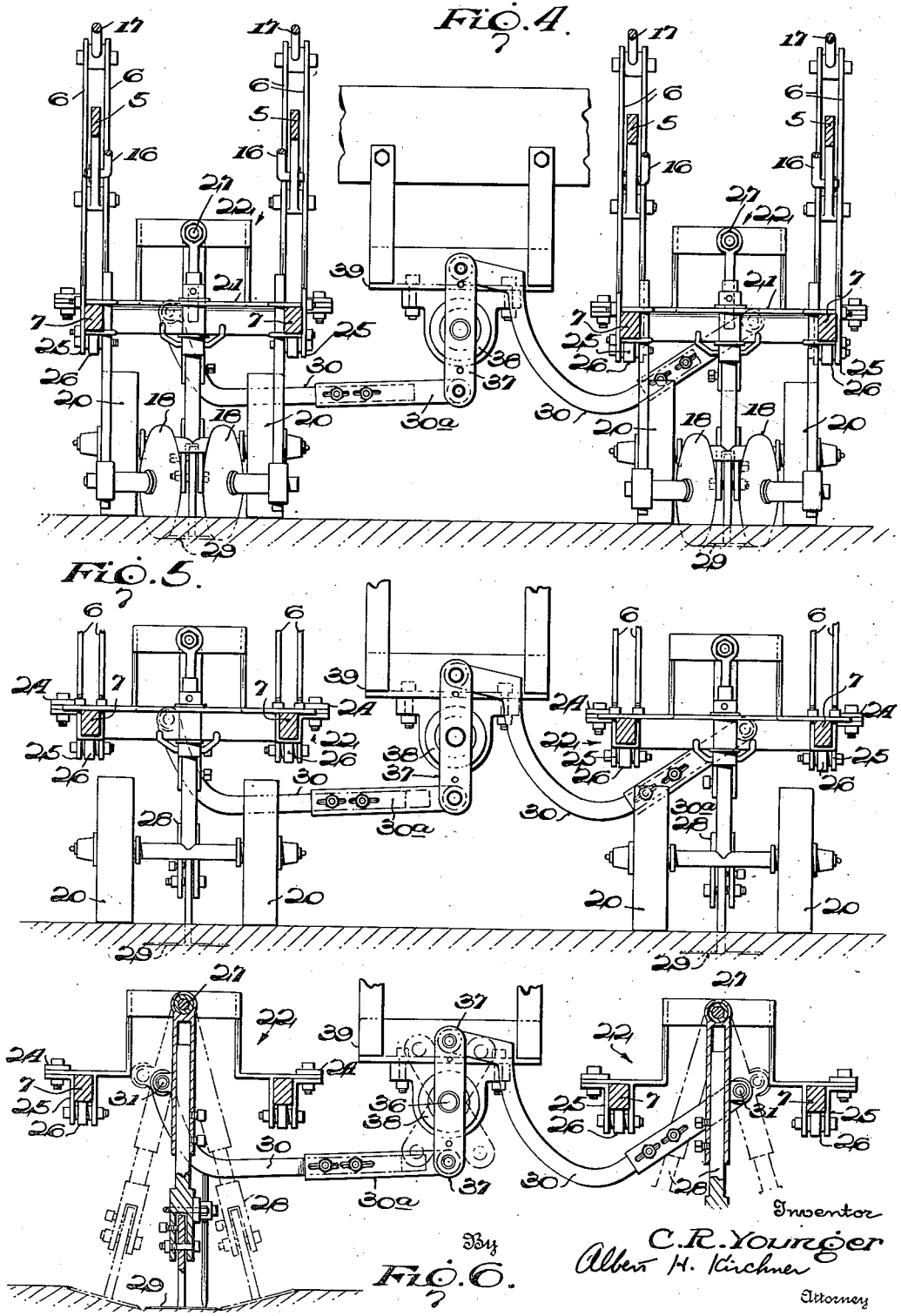

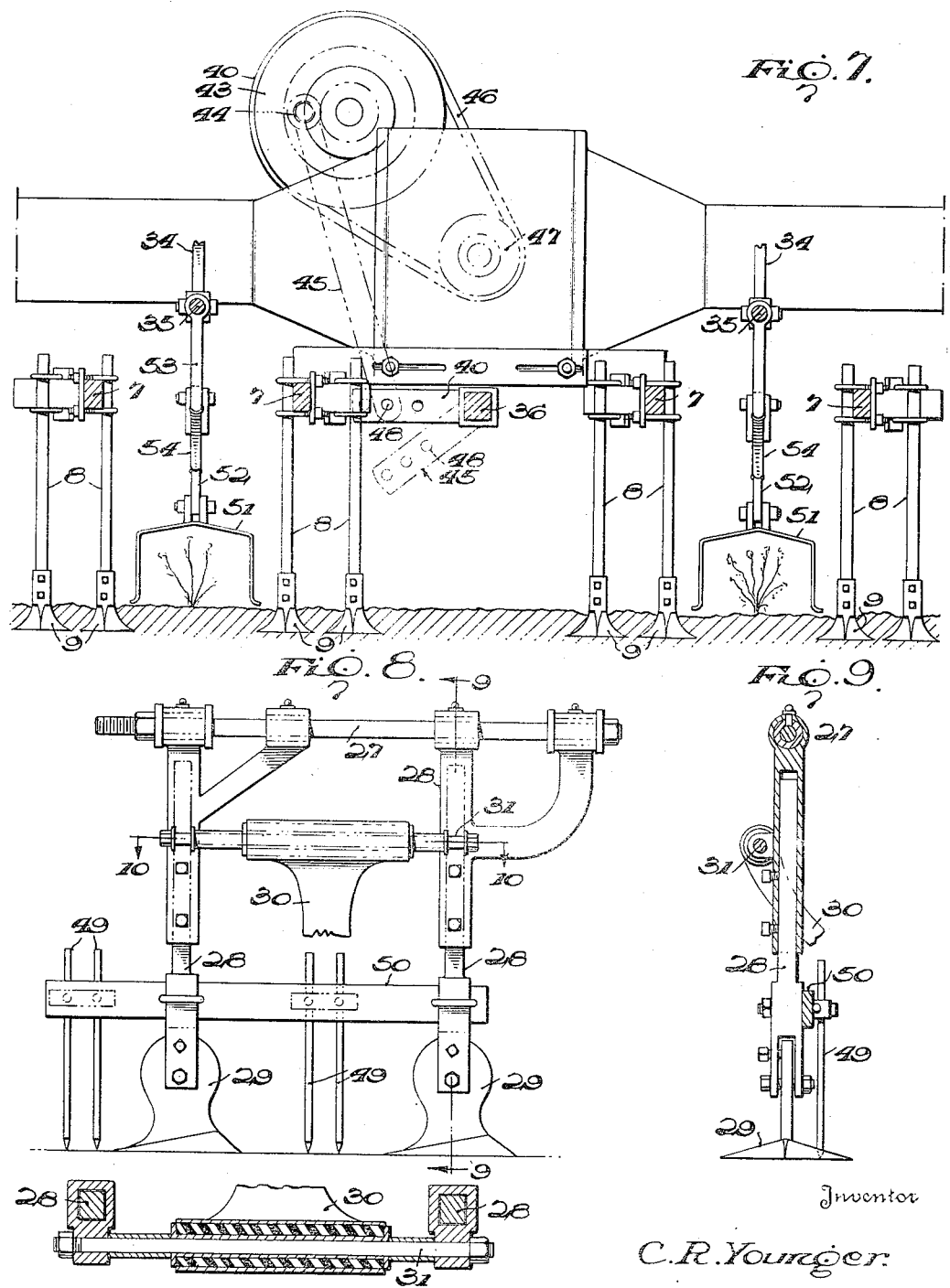

UNITED STATES PATENT OFFICE 2,592,097

TRACTOR-MOUNTED COTTON CHOPPER

Cousby R. Younger, Lilbourn, Mo.

Application September 11, 1947, Serial No. 773,334

6 Claims. (Cl. 97—19)

This application is a continuation-in-part of my copending application Serial No. 643,365, filed January 25, 1946, now abandoned.

The present invention relates to plant cultivation, and more particularly to a machine for chopping and performing related operations on cotton plants, beet sugar plants, and the like.

A principal object of the invention is to provide a single mechanical assembly which can readily be mounted on a standard agricultural tractor of conventional type and which, when driven over a field of growing plants, will automatically and simultaneously perform the operations of chopping, plowing, hilling and weeding.

Another object is to provide a machine in which the chopping mechanism is driven by the power take-off which is standard on most agricultural tractors.

A further object is to provide a machine in which the stroke of the chopping blades is synchronized with the movement of the driving wheels of the tractor, and in which the transverse path through which each blade is swung is adjustable longitudinally of the machine, from which it results that successive chopping operations of the same field can be made without subjecting the stalks left standing to the danger of being struck and injured by the chopping blades.

Another object is to mount the chopping and plowing mechanisms under downwardly directed pressure so that the forward movement of the machine will not have any tendency to lift the chopping and plowing blades or introduce any non-uniformity into the depth of the successive strokes.

General objects are concerned with providing a simple, durable and relatively inexpensive machine for performing in a single traverse of a row of plants of cotton or the like all the usual cultivating operations, thus entirely eliminating the arduous manual labor heretofore required.

With the foregoing and other objects in view, a preferred embodiment of the invention, which has been thoroughly tested in actual use and has functioned with complete satisfaction, is shown in the accompanying drawings, in which Figure 1 is a side elevational view of a tractor equipped with the mechanism which forms the subject of the invention;

Fig. 2 is a perspective view of the mechanism, shown separated from the tractor;

Fig. 3 is a top plan view of the structure;

Fig. 4 is a vertical cross sectional view taken on the line 4—4 of Fig. 1;

Fig. 5 is a vertical cross sectional view taken on the line 5—5 of Fig. 1;

Fig. 6 is a vertical cross sectional view taken on the line 6—6 of Fig. 1;

Fig. 7 is a vertical cross sectional view taken on the line 7—7 of Fig. 1;

Fig. 8 is a detail side elevational view of a pair of chopping hoes and appurtenant structure at one side of the machine;

Fig. 9 is a vertical cross sectional view taken on the line 9—9 of Fig. 8; and

Fig. 10 is a horizontal cross sectional view taken on the line 10—10 of Fig. 8.

But these figures and the following description of them are to be regarded as merely illustrative of the invention and not as limiting it to the precise structural details and arrangements there disclosed, since the principles of the invention are of broad application as defined by the appended claims.

A standard type of agricultural tractor 1 having front wheels 1a and rear wheels 1b is provided with a cultivator master frame including, at the front of the tractor, a heavy transverse horizontal member 2 which projects laterally from both sides of the machine and mounts, at each side of the tractor motor with its superposed fuel tank 3, two separated pairs of spaced parallel vertical plates 4.

In the lower portion of each of the pairs of plates 4 a link 5 is pivoted and extends back to a pivotal connection in the upper portions of similar spaced parallel vertical plates 6 which hang from the link 5. The bottoms of these latter plates are bolted or equivalently secured to longitudinally extending members in the form of plow beams 7 which are flared laterally apart at their rear end portions and there mount the upstanding helves or shanks 8 of cultivating plows 9. Thus the machine provides eight such plows, for digging eight furrows.

The spacing of these furrows is fixed by the lateral separation of the plows, which is determined by the shape and position of the beams 7. The depth of cut can be regulated by adjusting the individual helves 8 relatively to the beams. The beams on each side of the machine are maintained pressed down, so that the plows 9 are held by pressure into digging relation with the ground, by swinging a lever 10 through adjusted positions with relation to a toothed latching sector 11 to cause a link 12 to push an arm 13 which radiates from a rock shaft 14 journaled in the plates 4 above the frame member 2 and which has arms 15 pivoted to sleeves 15a which are slidable on the rods 16, and the bottom ends of these rods are pivoted in the links 5. A coil spring 16a is mounted on each rod 16 with one end fastened to the sleeve 15a of each arm 15 and the other end fixed to an abutment 16b fixed on the rod, so that when the shaft 14 is rocked counter-clockwise by pulling on the link 12 the plow beams 7 will be pressed down toward the ground, and when it is oppositely rotated, by pushing the link 12 forwardly, the spring 16a will be tensioned to lift the plow beams.

To keep the beams 7 accurately horizontal during their up and down movements, tie rods 17 are pivotally connected between the plates 6 and the rock shaft 14. These rods 17, which are substantially parallel with the links 5, form with the members 4, 5 and 6 a parallel linkage system, so that the plates 6 are constrained to a vertical movement, which keeps the beams 7 accurately horizontal.

The lever 10 is duplicated on both sides of the machine, and each lever controls the lifting and lowering of the plow beams (and all the instrumentalities carried by them, as will hereinafter be described) on one side of the machine. In the drawings only one of the two levers 10 is shown, in the interest of avoiding confusion of the illustration and obstruction of other parts, but it will be understood that the omitted lever is formed, mounted and connected exactly like the one which is shown and operates the link 12 at the upper part of Fig. 2 to control the elevation of the plow beams on the far side of the machine, which is the upper part of the view in Fig. 2.

The beams and their appurtenant mechanism can be raised and lowered also by power means through the medium of a standard power lift device such as are commonly provided on agricultural tractors. Such a power lift is shown conventionally at L in Fig. 2 geared to the rock shaft 14 to rotate it. By this means the beams 7 etc. can be quickly elevated or lowered by simply releasing the latches of the levers 10 and turning on the power lift.

Disc hillers 18 are mounted to depend rigidly from stems 19 at the forward end of the beams 7, and ground rollers or gage wheels 20 are similarly mounted at these locations. These gage wheels perform the useful and important function of maintaining at a uniform depth the several instrumentalities which penetrate the ground during operation of machine.

The forward ends of the two beams 7 at each side of the machine are connected and stiffened by a cross brace 21, and these beams mount a longitudinally adjustable carriage 22 which comprises similar front and rear cross members 23 connected by side members 24 having depending brackets 25 which mount rollers 26 running along the under sides of the beams. The carriage is rectangular in plan, but its cross members are U-shaped or centrally upwardly arched and at their mid-portions have slide bearings journaling a rock shaft in the form of a rod 27 on which a pair of depending stems 28 are journaled. These stems are made adjustable in length, as by means of telescoping sections, and carry at their bottom ends chopping hoes 29 which are swingable from side to side, through arcuate paths having the axis of the rod 27 as their center, by push and pull rods 30 which are made telescopically extensible as shown at 30a in Figs. 4, 5 and 6 and have their outer ends journaled on a pin 31 connecting the two stems 28 of the carriage 22.

Both carriages 22 are adjustable longitudinally along their beams 7 by a single lever 32 which is fulcrumed in a latching sector 33 to swing a pair of arms 34 and thereby pull or push a pair of links 35 which are jointed to the rear cross member 23 of each of the carriages.

The push and pull rods 30, which are identical in function and generally similar in shape except that they are somewhat differently bent to dispose their inner ends at different elevations in the generally central zone of the machine, are reciprocated to swing the hoes 29 by rotary movements of a main drive shaft 36 to which the inner ends of the rods 30 are connected by an arm 37 forming a pair of diametrically opposed cranks. The shaft 36 has its forward end portion journaled in a self-aligning slide bearing 38 hung by a bracket 38a from the main bed of the machine and is made with a telescoping drive shaft portion 39 to accommodate its extension and contraction required by forward and rear adjustment of the carriages 22.

The shaft 39 is rocked by the swinging of a crank arm 40 which is driven from the standard power take-off of the tractor. To effect this driving arrangement the shaft 39 is journaled in the lower part of a bracket 41 which depends from the bed of the machine at its rear end portion, and the upper part of this bracket journals a stub shaft 42 on which is fixed a pulley 43 having an eccentric pin 44 joined to the crank arm 40 by a pitman 45. The pulley is driven by a belt 46 from the pulley 47 of the standard tractor power shaft or take-off, and the amplitude of the rocking movement of the shaft 36 can be regulated by adjusting the pin connection of the crank arm 40 and the connecting rod 45 in any selected one of a series of pin bearing holes 48 formed in the arm.

It will be evident from the foregoing that when the tractor motor is in operation and the power take-off pulley is rotating the chopping hoes 29 will be swung laterally through arcs of adjustably selected length to cut with their sharpened side edges the stalks of plants at spaced intervals along the rows of plants as the machine is driven along the rows. At the same time the disc hillers 18 and the plows 9 cut into and move the soil in lines along the path of movement, and prongs or tines 49, depending just behind each hoe from a bar 50 connecting each pair of adjacent hoes, may be used to scratch weeds from the rows of plants.

A crop shield 51 is hung from two bars 52 which are pin-connected in selected openings in the horizontal trailing portion of an arm 53 which has a forward vertical portion depending from a connection sleeved over the shaft 27 at each side of the machine. A coil spring 54 connects one of the bars 52 with the arm 53 so that the shield may yield rearwardly upon encountering any obstruction and will be restored to vertical hanging position when the obstruction is passed. These shields protect the plants that are left standing by the chopping hoes, keeping them from being covered or damaged by soil turned up by the plows.

In the use of the machine, the operator occupies the seat and grasps the steering wheel, both shown in Fig. 1, and manipulates the usual driving controls (not shown) in the usual way. Starting out for the first time along a pair of rows, the operator engages the customary clutch or other connection to drive the power take-off, with the levers 10 properly set to lower the plow beams 7 to the proper position to depress the plows 9 and the hillers 18 and the carriages 22 with their chopping blades 29 sufficiently to make furrows and chopping strokes of the desired depths and hills of the desired height. The machine is then put into forward movement along the two rows, and the chopping strokes are made in regular, periodic sequence to remove plants at intervals which are regularly spaced regardless of the speed at which the machine travels, since the power take-off operates in synchronism with the propulsion of the machine.

The first chopping operation on a row may begin with any plant. However, each subsequent chopping of a row must be registered with relation to the plants left standing, so that the chopping strokes will be made only through the spaces previously cut out and so that no plants previously left standing will be struck by the chopping blades or otherwise injured. This is readily accomplished by the present machine in the following way:

The machine is driven up to the beginning of a previously chopped pair of rows and the plows, hillers and chopping blades are set at the desired depth. The power take-off and the machine are then put into operation. As this is done, the lever 32 is manipulated to advance or retract the carriages 22 sufficiently to cause the chopping blades to swing through the previously chopped spaces and, with the lever 32 thus set, the rows are traversed to their end. Thereupon the levers 10 or the lift L are operated to elevate the beams and carriage and the whole operation is repeated at the next pair of rows. I consider this capacity of the machine to rechop a row, or a pair of rows, without damaging plants left standing from a previous chopping, to be an important feature and advantage.

It will be evident that during each traverse of the machine along a pair of rows the prongs 49 tend to scratch out weeds from the hills formed by the hillers 18 while the shields 51 protect the plants from being objectionably covered by earth thrown up by the plows 9.

Mounting each pair of chopping blades 29 in tandem for swinging in unison, and shaping them with their cutting edges at each side and converging forwardly at an acute angle, as shown best in Fig. 2, together with operating them through their swinging movement as the machine is driven forward, results in producing hills of diamond shape. Thus an increased amount of weeds and grass are cut from between the hills. This too I regard as an important feature and advantage of the new construction.

Other advantages will, it is believed, be evident to those skilled in the art to which the invention relates.

I claim:

1. A cultivating machine for a row of growing plants comprising a vehicle, a pair of plow beams extending in laterally spaced substantial parallelism generally longitudinally of the vehicle, a carriage frame generally rectangular in plan mounted for longitudinal adjustment on the beams and including cross members having elevated mid portions, a shaft journaled in said mid portions, chopping blade means pivoted on said shaft and depending therefrom through the space between the beams, and power means coupled to the chopping blade means below their pivot points for imparting a swinging movement to them.

2. A cultivating machine for a row of growing plants comprising a vehicle frame, a rockshaft mounted longitudinally of the frame, means for oscillating the rockshaft, a pair of longitudinally extending plow beams positioned at each side of the rockshaft, means hanging each pair of beams from the frame for vertically adjustable positioning, a carriage mounted on each pair of beams and slidable longitudinally thereon to adjusted positions lengthwise of the frame, a chopping blade pivoted to each carriage and depending therefrom, and a rod connecting each blade with the rockshaft to oscillate the blade when the rockshaft is oscillated.

3. A cultivating machine for a row of growing plants comprising a vehicle frame, a longitudinally extending shaft at each side of the frame, means for oscillating said shafts, a longitudinally extending plow beam positioned at each side of each shaft, means hanging said plow beams from the frame in vertically adjustable position, a carriage mounted on each pair of adjacent beams and journaling one of said shafts, means for moving each carriage to selected adjusted positions longitudinally of its beams, and a chopping blade depending from each shaft for swinging movement as the shaft oscillates.

4. A cultivating machine for rows of growing plants comprising a vehicle having a uni-directionally rotating power shaft and having a frame, a longitudinally extending rock shaft at each side of the frame, a longitudinally extending plow beam positioned adjacent each shaft, means hanging said plow beams from the frame in vertically adjustable position, means mounting each shaft on the adjacent beam for adjusted movement longitudinally of the beam, a chopping blade depending from each shaft, and means for oscillating said shafts in any longitudinally adjusted position thereof comprising pitman means operatively connected to the power shaft and telescopically related drive shaft sections connected respectively to the pitman means and to the rock shafts.

5. A cultivating machine for rows of growing plants comprising a vehicle frame including a longitudinally extending member at each side of the frame, a longitudinally extending rock shaft supported by each of said members for oscillating movement and for movement to axially adjusted positions relatively to the adjacent member, a chopping blade depending from each rock shaft for swinging movement with oscillation of the rock shaft, and common drive means for oscillating both rock shafts in any longitudinally adjusted position thereof comprising a unidirectional rotating power shaft, telescopically adjustable drive shafts, reciprocating pitman means connecting the power and drive shafts, and including drive transmitting means operatively connecting the drive and rock shafts.

6. A cultivating machine for rows of growing plants comprising a vehicle frame including a longitudinally extending member at each side of the frame, a longitudinally extending rock shaft supported by each of said members for oscillating movement and for movement to axially adjusted positions relative to the adjacent member, a pair of chopping blades depending in longitudinally spaced relation from each rock shaft for swinging movement with oscillation of the rock shaft, and common drive means for oscillating both rock shafts in any longitudinally adjusted position thereof comprising a uni-directionally rotating power shaft, telescopically adjustable drive shafts, reciprocating pitman means connecting the power and drive shafts, and including drive transmitting means operatively connecting the drive and rock shafts.

COUSBY R. YOUNGER.

REFERENCES CITED

The following references are of record in the file of this patent:

UNITED STATES PATENTS

| Number | Name | Date |
|---|---|---|
| 1,152,975 | Richey | Sept. 7, 1915 |
| 1,795,029 | Kimball | Mar. 3, 1931 |
| 1,828,615 | Pearce | Oct. 20, 1931 |
| 1,853,023 | Brown et al. | Apr. 12, 1932 |
| 1,853,729 | Horn | Apr. 12, 1932 |
| 1,896,011 | Perry | Jan. 31, 1933 |
| 2,087,035 | Ledbetter et al. | July 13, 1937 |
| 2,341,181 | Johnson | Feb. 8, 1944 |
| 2,409,123 | Harral | Oct. 8, 1946 |

FOREIGN PATENTS

| Number | Country | Date |
|---|---|---|
| 11,717 | Great Britain | of 1904 |

OTHER REFERENCES

"Cross-Blocking Sugar Beets by Machine," U. S. Department of Agriculture Leaflet No. 97, issued August 1933.